US011929570B2

(12) United States Patent
Langford et al.

(10) Patent No.: US 11,929,570 B2
(45) Date of Patent: Mar. 12, 2024

(54) CONTACT PLUNGER CARTRIDGE ASSEMBLY

(71) Applicant: Hunting Titan, Inc., Pampa, TX (US)

(72) Inventors: Dale Langford, Pampa, TX (US); Andy Lane, Wolfforth, TX (US); Rick Blain, Pampa, TX (US)

(73) Assignee: Hunting Titan, Inc., Pampa, TX (US)

(*) Notice: Subject to any disclaimer, the term of this patent is extended or adjusted under 35 U.S.C. 154(b) by 595 days.

(21) Appl. No.: 17/127,639

(22) Filed: Dec. 18, 2020

(65) Prior Publication Data

US 2021/0140282 A1 May 13, 2021

Related U.S. Application Data

(62) Division of application No. 15/775,234, filed as application No. PCT/US2016/061631 on Nov. 11, 2016, now Pat. No. 10,900,333.

(Continued)

(51) Int. Cl.

| | |
|---|---|
| ***H01R 13/24*** | (2006.01) |
| ***E21B 17/02*** | (2006.01) |
| ***E21B 43/119*** | (2006.01) |
| ***F42C 19/06*** | (2006.01) |
| ***H01R 13/08*** | (2006.01) |
| *E21B 43/1185* | (2006.01) |
| *F42D 1/04* | (2006.01) |

(Continued)

(52) U.S. Cl.

CPC ......... *H01R 13/08* (2013.01); *E21B 17/0285* (2020.05); *E21B 43/119* (2013.01); *F42C 19/06* (2013.01); *E21B 43/1185* (2013.01); *F42D 1/04* (2013.01); *F42D 1/05* (2013.01); *H01R 13/533* (2013.01)

(58) Field of Classification Search

CPC ... H01R 13/08; H01R 13/533; E21B 17/0285; E21B 43/119; E21B 43/1185; E21B 17/028; F42C 19/06; F42D 1/04; F42D 1/05

See application file for complete search history.

(56) References Cited

U.S. PATENT DOCUMENTS

| | | | |
|---|---|---|---|
| 2,099,080 | A | 11/1937 | Rusler |
| 2,169,952 | A | 8/1939 | Holmes |

(Continued)

FOREIGN PATENT DOCUMENTS

| | | | |
|---|---|---|---|
| CA | 2003166 | A1 | 5/1991 |
| CA | 2824838 | A1 | 2/2015 |

(Continued)

OTHER PUBLICATIONS

Dynaenergetics, Selective Perforating Switch, Product Information Sheet, May 27, 2011.

(Continued)

*Primary Examiner* — Abdullah A Riyami
*Assistant Examiner* — Nelson R. Burgos-Guntin

(57) ABSTRACT

An electrical connector apparatus for use in a downhole tool comprising a housing, a contact screw within outer threads and inner threads, a contact plunger within the inner bore of the housing and a second cylinder protruding from the first cylinder. The contact spring is located between the contact plunger and the contact screw and pre-loads the contact plunger within the housing.

16 Claims, 8 Drawing Sheets

Related U.S. Application Data

(60) Provisional application No. 62/254,540, filed on Nov. 12, 2015.

(51) Int. Cl.
*F42D 1/05* (2006.01)
*H01R 13/533* (2006.01)

(56) References Cited

U.S. PATENT DOCUMENTS

| | | | |
|---|---|---|---|
| 2,216,359 | A | 10/1940 | Spencer |
| 2,252,270 | A | 8/1941 | Miller |
| 2,540,184 | A | 2/1951 | Broyles |
| 2,598,651 | A | 5/1952 | Spencer |
| 2,898,416 | A | 8/1959 | Clurman |
| 2,913,696 | A | 11/1959 | Burgher |
| 3,116,689 | A | 1/1964 | Sumner |
| 3,180,261 | A | 4/1965 | Moore |
| 3,264,989 | A | 8/1966 | Rucker |
| 3,504,723 | A | 4/1970 | Cushman et al. |
| 3,800,705 | A | 4/1974 | Tamplen |
| 4,041,865 | A | 8/1977 | Evans et al. |
| 4,182,216 | A | 1/1980 | DeCaro |
| 4,208,966 | A | 6/1980 | Hart |
| 4,261,263 | A | 4/1981 | Coultas et al. |
| 4,266,613 | A | 5/1981 | Boop |
| 4,306,628 | A | 12/1981 | Adams, Jr. et al. |
| 4,512,418 | A | 4/1985 | Regalbuto et al. |
| 4,574,892 | A | 3/1986 | Grigar et al. |
| 4,650,009 | A | 3/1987 | McClure et al. |
| 4,743,201 | A | 5/1988 | Robinson et al. |
| 4,850,438 | A | 7/1989 | Regalbuto |
| 4,852,494 | A * | 8/1989 | Williams ............ E21B 43/1185 200/61.08 |
| 4,869,171 | A | 9/1989 | Abouav |
| 4,884,506 | A | 12/1989 | Guerreri |
| 4,909,320 | A | 3/1990 | Hebert et al. |
| 4,967,048 | A | 10/1990 | Langston |
| 5,027,708 | A | 7/1991 | Gonzalez |
| 5,038,682 | A | 8/1991 | Marsden |
| 5,042,593 | A | 8/1991 | Pertuit |
| 5,060,573 | A | 10/1991 | Montgomery |
| 5,088,413 | A | 2/1992 | Huber et al. |
| 5,105,742 | A | 4/1992 | Sumner |
| 5,204,491 | A | 4/1993 | Aureal et al. |
| 5,347,929 | A | 9/1994 | Erche et al. |
| 5,392,860 | A | 2/1995 | Ross |
| 5,436,791 | A | 7/1995 | Turano et al. |
| 5,503,077 | A | 4/1996 | Motley |
| 5,571,986 | A | 11/1996 | Snider et al. |
| 5,756,926 | A | 5/1998 | Bonbrake et al. |
| 5,859,383 | A | 1/1999 | Davison et al. |
| 6,085,659 | A | 7/2000 | Beukes et al. |
| 6,140,905 | A | 10/2000 | Shoji |
| 6,418,853 | B1 | 7/2002 | Duguet et al. |
| 6,557,636 | B2 | 5/2003 | Cernocky |
| 6,618,237 | B2 | 9/2003 | Eddy et al. |
| 6,648,335 | B1 | 11/2003 | Ezell |
| 6,739,914 | B2 | 5/2004 | Strandfelt |
| 7,193,527 | B2 | 3/2007 | Hall et al. |
| 7,347,278 | B2 | 3/2008 | Lerche et al. |
| 7,461,580 | B2 | 12/2008 | Bell et al. |
| 7,568,429 | B2 | 8/2009 | Hummel et al. |
| 7,682,206 | B2 | 3/2010 | Kainz |
| 7,762,172 | B2 | 7/2010 | Li et al. |
| 7,762,331 | B2 | 7/2010 | Goodman et al. |
| 7,778,006 | B2 | 8/2010 | Stewart et al. |
| 7,810,430 | B2 | 10/2010 | Chan et al. |
| 7,929,270 | B2 | 4/2011 | Hummel et al. |
| 7,934,453 | B2 | 5/2011 | Moore |
| 7,980,309 | B2 | 7/2011 | Crawford |
| 8,069,789 | B2 | 12/2011 | Hummel et al. |
| 8,074,737 | B2 | 12/2011 | Hill et al. |
| 8,157,022 | B2 | 4/2012 | Bertoja et al. |
| 8,182,212 | B2 | 5/2012 | Parcell |
| 8,256,337 | B2 | 9/2012 | Hill et al. |
| 8,287,318 | B1 * | 10/2012 | Walters ................ H01R 13/533 439/700 |
| 8,395,878 | B2 | 3/2013 | Stewart et al. |
| 8,451,137 | B2 | 5/2013 | Bonavides et al. |
| 8,468,944 | B2 | 6/2013 | Givens et al. |
| 8,578,090 | B1 | 11/2013 | Jernigan, IV |
| 8,661,978 | B2 | 3/2014 | Backhus et al. |
| 8,689,868 | B2 | 4/2014 | Lerche et al. |
| 8,875,787 | B2 | 11/2014 | Tassaroli |
| 8,881,816 | B2 | 11/2014 | Glenn et al. |
| 8,884,778 | B2 | 11/2014 | Lerche et al. |
| 8,960,288 | B2 | 2/2015 | Sampson |
| 9,080,433 | B2 | 7/2015 | Lanclos et al. |
| 9,175,553 | B2 | 11/2015 | McCann et al. |
| 9,464,508 | B2 | 10/2016 | Lerche et al. |
| 9,494,021 | B2 | 11/2016 | Parks et al. |
| 9,581,422 | B2 | 2/2017 | Preiss et al. |
| 9,689,223 | B2 | 6/2017 | Schacherer et al. |
| 9,709,373 | B2 | 7/2017 | Hikone et al. |
| 2002/0020320 | A1 | 2/2002 | Lebaudy et al. |
| 2002/0062991 | A1 | 5/2002 | Farrant et al. |
| 2002/0151223 | A1 | 10/2002 | Strandfelt |
| 2003/0000411 | A1 | 1/2003 | Cernocky et al. |
| 2003/0001753 | A1 | 1/2003 | Cernocky et al. |
| 2005/0178282 | A1 | 8/2005 | Brooks et al. |
| 2005/0229805 | A1 | 10/2005 | Myers, Jr. et al. |
| 2007/0084336 | A1 | 4/2007 | Neves |
| 2007/0158071 | A1 | 7/2007 | Mooney, Jr. et al. |
| 2008/0047456 | A1 | 2/2008 | Li et al. |
| 2008/0047716 | A1 | 2/2008 | McKee et al. |
| 2008/0173240 | A1 | 7/2008 | Anderson et al. |
| 2009/0004929 | A1 | 1/2009 | Kainz |
| 2009/0050322 | A1 | 2/2009 | Hill et al. |
| 2009/0272519 | A1 | 11/2009 | Green et al. |
| 2010/0230104 | A1 | 9/2010 | Nolke et al. |
| 2011/0024116 | A1 | 2/2011 | McCann et al. |
| 2011/0042069 | A1 | 2/2011 | Bailey et al. |
| 2012/0199031 | A1 | 8/2012 | Lanclos |
| 2012/0199352 | A1 | 8/2012 | Lanclos et al. |
| 2012/0242135 | A1 | 9/2012 | Thomson et al. |
| 2012/0247771 | A1 | 10/2012 | Black et al. |
| 2012/0298361 | A1 | 11/2012 | Sampson |
| 2013/0118342 | A1 | 5/2013 | Tassaroli |
| 2013/0199843 | A1 | 8/2013 | Ross |
| 2014/0000877 | A1 * | 1/2014 | Robertson ........... E21B 43/1185 166/250.15 |
| 2015/0176374 | A1 | 6/2015 | LaGrange et al. |
| 2015/0295359 | A1 | 10/2015 | Vinther et al. |
| 2016/0084048 | A1 | 3/2016 | Harrigan et al. |
| 2016/0168961 | A1 | 6/2016 | Parks et al. |
| 2017/0211363 | A1 * | 7/2017 | Bradley .................. F42B 5/035 |
| 2018/0347324 | A1 * | 12/2018 | Langford .............. E21B 17/028 |
| 2019/0195054 | A1 * | 6/2019 | Bradley .................... F42D 1/04 |

FOREIGN PATENT DOCUMENTS

| | | | |
|---|---|---|---|
| CA | 2821506 | A1 | 1/2018 |
| EP | 0088516 | B1 | 5/1986 |
| EP | 0679859 | A2 | 11/1995 |
| EP | 0694157 | B1 | 8/2001 |
| EP | 2702349 | B1 | 11/2015 |
| GB | 169904 | A | 10/1921 |
| GB | 2383236 | A | 6/2003 |
| WO | 2001059401 | A1 | 8/2001 |
| WO | 200229201 | A1 | 4/2002 |
| WO | 2007128729 | A1 | 11/2007 |
| WO | 2009091422 | A2 | 7/2009 |
| WO | 2012106640 | A2 | 8/2012 |
| WO | 2012149584 | A1 | 11/2012 |
| WO | 2014046670 | A1 | 3/2014 |
| WO | 2015006869 | A1 | 1/2015 |

OTHER PUBLICATIONS

Dynaenergetics, Electronic Top Fire Detonator, Product Information Sheet, Jul. 30, 2013.

(56) References Cited

OTHER PUBLICATIONS

German Patent Office, Office Action dated May 22, 2014, in German: See Office Action for German Patent Application No. 10 2013 109 227.6, which is in the same family as PCT Application No. PCT/EP2014/065752 (published as WO 2015/028204).
PCT Search Report and Written Opinion, dated May 4, 2015: See Search Report and Written opinion for PCT Application No. PCT/EP2014/065752.
Hunting Titan, Wireline Top Fire Detonator Systems, Product Information Sheet, date unknown, http://www.hunting-intl.com/titan/perforating-guns-and-setting-tools/wireline-top-fire-detonator-systems, 1 page.
Dynaenergetics, DYNAselect System, information downloaded from website, Jul. 3, 2013, http://www.dynaenergetics.com/.
Jim Gilliat/Khaled Gasmi, New Select-Fire System, Baker Hughes, Presentation—2013 Asia-Pacific Perforating Symposium, Apr. 29, 2013, http://www.perforators.org/presentations.php.
Dynaenergetics, DYNAselect Electronic Detonator 0015 SFDE ROX 1.4S, Product Information, Dec. 16, 2011.
Dynaenergetics, DYNAselect Electronic Detonator 0015 SFDE ROX 1.4B, Product Information, Dec. 16, 2011.
Dynaenergetics, Gun Assembly, Products Summary Sheet, May 7, 2004.
Dynaenergetics, Selective Perforating Switch, information downloaded from website, Jul. 3, 2013, http://www.dynaenergetics.com/.
Austin Powder Company, A-140 F Detonator and Block, 2 pages.
CORELAB, RF-Safe Green Det, Side Block for side Initiation, Owen Oil Tools & Pacific Scientific Brochure, 1 page.
Jet Research Center, Pioneer of the Oilwell Shaped Charge Brochure, 2 pages.
Jet Research Center, Detonators, Detonating Cords, Explosive Components Catalog. www.jetresearch.com., 36 pages.
Horizontal Wireline Services, IPS-12-09-Presentation of a completion method of shale demonstrated through an example of the Marcellus Shale, Pennsylvania, USA, 17 pages.
Schlumberger, Dec. 22, 2012 European and West African Perforating Symposium, Selective Perforation a game changer in perforating technology case study, Norway, 14 pages.
Marathon Oil Co., Explosives Safety & Security Conference, Oil and Gas, 20 pages.
Schulumberger, MENAPS-11-15 Combining and Customizing Technologies for Perforating Horizontal Wells in Algeria, 20 pages.
Baker Hughes Incorporated, 2012 International Perforating Symposium, IPS-12-28 Long Gun Deployment Systems, Apr. 26 and Apr. 27, 2011, The Woodlands, USA, 11 pages.
Owen Oil Tools, Update on API RP67: Recommended Practice for Oilfield Explosive Safety, 6 pages.
Baker Hughes Incorporated, New Select Fire System, Jim Gilliat, Khaled Gasmi, 16 pages.
Baker Hughes, SurePerf Rapid Select-Fire System Overview, 2 pages.
https://www.onepetro.org/conference-paper/SPE-119365-MS, Minimize Risk and Improve Efficiency Associated With Electric Coiled Tubing Perforating Operations—OnePetro, downloaded Jan. 30, 2018, 2 pages.
ONEPETRO, CEPSA SPE, Combining and Customizing Technologies for Perforating Horizontal Wells in Algeria, Jun. 2010, 2 pages.
International preliminary report on patentability, PCT/US2016/061631 dated May 15, 2018, 9 pages.
Notification of Transmittal of the International Search Report and the Written Opinion of the International Searching Authority, PCT Application No. PCT/US2016/061631, dated Mar. 14, 2017, 13 pages.
Office action restriction requirement dated Mar. 23, 2020, 8 pages. U.S. Appl. No. 15/775,234, filed May 10, 2018.
Response to Office action restriction requirement dated Mar. 23, 2020 filed on May 22, 2020, 10 pages. U.S. Appl. No. 15/775,234, filed May 10, 2018.
Office action dated Jun. 5, 2020, 32 pages. U.S. Appl. No. 15/775,234, filed May 10, 2018.
Response to Office action dated Jun. 5, 2020 filed on Sep. 8, 2020, 7 pages. U.S. Appl. No. 15/775,234, filed May 10, 2018.
Supplementary European Search Report, completed Apr. 10, 2019, Application No. EP16865130, 4 pages.
Notification of Transmittal of the International Search Report and the Written Opinion of the International Searching Authority, PCT Application No. PCT/US15/32222, dated Oct. 28, 2015, 18 pages.
Supplementary European Search Report, based on EP 15796416, dated Sep. 18, 2017, 6 pages.
Office Action, Canadian application No. 2,933,756, dated May 25, 2017, 4 pages.
Response to Office Action, Canadian application No. 2,933,756, dated Nov. 23, 2017, 40 pages.
Notification concerning transmittal of international preliminary report on patentability, PCT Application No. PCT/US15/32222, dated Dec. 8, 2016, 14 pages.
European extended search report, completed Jan. 15, 2019, EP18195649, 6 pages.

* cited by examiner

CONTACT PLUNGER CARTRIDGE ASSEMBLY

RELATED APPLICATIONS

This application is a U.S. divisional application of U.S. Nonprovisional patent application Ser. No. 15/775,234, filed May 10, 2018, which is a 371 of International Application No. PCT/US16/61631, filed Nov. 11, 2016, which claims priority to U.S. Provisional Application No. 62/254,540, filed Nov. 12, 2015.

BACKGROUND OF THE INVENTION

Generally, when completing a subterranean well for the production of fluids, minerals, or gases from underground reservoirs, several types of tubulars are placed downhole as part of the drilling, exploration, and completions process. These tubulars can include casing, tubing, pipes, liners, and devices conveyed downhole by tubulars of various types. Each well is unique, so combinations of different tubulars may be lowered into a well for a multitude of purposes.

A subsurface or subterranean well transits one or more formations. The formation is a body of rock or strata that contains one or more compositions. The formation is treated as a continuous body. Within the formation hydrocarbon deposits may exist. Typically a wellbore will be drilled from a surface location, placing a hole into a formation of interest. Completion equipment will be put into place, including casing, tubing, and other downhole equipment as needed. Perforating the casing and the formation with a perforating gun is a well known method in the art for accessing hydrocarbon deposits within a formation from a wellbore.

Explosively perforating the formation using a shaped charge is a widely known method for completing an oil well. A shaped charge is a term of art for a device that when detonated generates a focused explosive output. This is achieved in part by the geometry of the explosive in conjunction with an adjacent liner. Generally, a shaped charge includes a metal case that contains an explosive material with a concave shape, which has a thin metal liner on the inner surface. Many materials are used for the liner; some of the more common metals include brass, copper, tungsten, and lead. When the explosive detonates the liner metal is compressed into a super-heated, super pressurized jet that can penetrate metal, concrete, and rock.

A perforating gun has a gun body. The gun body typically is composed of metal and is cylindrical in shape. Within a typical gun tube is a charge holder or carrier tube, which is a tube that is designed to hold the actual shaped charges. The charge holder will contain cutouts called charge holes where the shaped charges will be placed.

A shaped charge is typically detonated by a booster or igniter. Shaped charges may be detonated by electrical igniters, pressure activated igniters, or detonating cords. One way to ignite several shaped charges is to connect a common detonating cord that is placed proximate to the igniter of each shaped charge. The detonating cord is comprised of material that explodes upon ignition. The energy of the exploding detonating cord can ignite shaped charges that are properly placed proximate to the detonating cord. Often a series of shaped charges may be daisy chained together using detonating cord.

A firing head is used to detonate the detonating cord in the perforating gun. The firing head may be activated by an electrical signal. Electricity may be provided by a wireline that ties into the cablehead at the top of a tool string. The electrical signal may have to travel through several components, subs, and tools before it gets to the firing head. A reliable electrical connector is needed to ensure the electrical signal can easily pass from one component to the next as it moves down the tool string. The electrical signal is typically grounded against the tool string casing. In order to prevent electrical shorting to ground the electrical connections must be insulated from tool components that are in electrical contact with the tool string casing.

SUMMARY OF EXAMPLE EMBODIMENTS

An example embodiment may include an electrical connector apparatus for use in a downhole tool with a plunger insulator, which may be a housing defining a cylinder with a first end, a second end, a central axis, having an inner bore with an open end at the first end of the cylinder, and having an axial through hole at the second end of the cylinder. The embodiment may also have a contact screw defining a cylindrical body sharing the central axis with a first end and a second end, having outer threads on the cylindrical body, and having an inner through bore with inner threads, wherein the contact screw is disposed within the inner bore of the housing. The embodiment may also have a contact plunger defining a first cylinder adapted to slideably engage with the inner bore of the housing and a second cylinder protruding from the first cylinder, slideably engaged with the through hole of the housing, and having a distal end. The embodiment may also have contact spring with a first end and a second end disposed within the inner bore of the housing between the contact plunger and the contact screw. The first end of the contact spring may be engaged with the first cylinder of the contact plunger and the second end of the contact spring may be engaged with the first end of the contact screw.

A variation of the example embodiment may include the electrical connector being adapted to engage a GO-Box pin electrical connector. The housing may be composed of an electrically non-conductive material. The contact spring may be electrically conductive. The contact screw may be electrically conductive. The contact screw may include a through slot tangentially located on its first end. The housing may include a portion of the inner bore having threads at the first end adapted to engage the outer threads of the contact screw. The housing may include an exterior hex shaped feature at the second end. The contact screw may be adapted to accept a contact rod threaded into the first end of the contact screw.

The example embodiment may be employed as part of a downhole tool string assembly that may include a cablehead adapted to interface with a wireline suspended from a surface location, a casing collar locator located proximate and downhole from the cablehead, a double seal contact sub located proximate and downhole from the casing collar locator, a first electrical cartridge connector electrically coupling the cablehead to the first electrical cartridge attached to the casing collar locator, a gun top sub located proximate and downhole from the double seal contact sub, a second electrical cartridge connector electrically coupling the double seal contact sub to the gun top sub, a gun assembly located proximate and downhole from the gun top sub, and a gun bottom sub located proximate and downhole from the gun assembly.

An example embodiment may include a cartridge electrical connector having a first cylinder having a common axis, a first end, a second end, a first inner bore with a first diameter extending axially from the first end to form a third end within the first cylinder, and a second inner bore with a second diameter extending through from the second end to the third end. It may include a second cylinder having a third diameter, a first end, a second end, and a third inner bore with a fourth diameter extending from the first end to the second end of the second cylinder, the second cylinder being located within the first inner bore, axially aligned with the first cylinder, and the first end of the second cylinder being aligned with the first end of the first cylinder. It may include a third cylinder having a fifth diameter, a first end, a second end, the third cylinder being located within the first inner bore, axially aligned with the first cylinder, and disposed in between the second cylinder and the third end of the first cylinder. It may include a fourth cylinder having a sixth diameter, being axially aligned with the first cylinder, having a first end integral with the second end of the third cylinder, and extending cantilevered from the third cylinder, through the second inner bore, and having a distal second end. It may include a spring axially aligned with the first cylinder and located in the first inner bore between the second end of the second cylinder and the first end of the third cylinder.

A variation of the example embodiment may include the first inner bore spanning the majority of the axial length of the first cylinder. The second diameter may be less than the first diameter. The third diameter may be substantially equal to the first diameter. The third diameter may be greater than the fourth diameter. The fifth diameter may be substantially equal to the first diameter. The sixth diameter may be substantially equal to the second diameter. The second cylinder may be threaded into the first inner bore. The third inner bore may have inner threads. The first cylinder may be electrically non-conductive. The second cylinder, third cylinder, fourth cylinder, and spring may be electrically conductive. The spring may be pre-loaded within the first inner bore. The second end of the third cylinder may be located flush against the third end of the first cylinder.

BRIEF DESCRIPTION OF THE DRAWINGS

For a thorough understanding of the present invention, reference is made to the following detailed description of the preferred embodiments, taken in conjunction with the accompanying drawings in which reference numbers designate like or similar elements throughout the several figures of the drawing. Briefly.

DETAILED DESCRIPTION OF EXAMPLE EMBODIMENTS

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems and method steps. It is to be expected that various equivalents, alternatives, and modifications are possible within the scope of the appended claims.

Figures 1A, 1B:
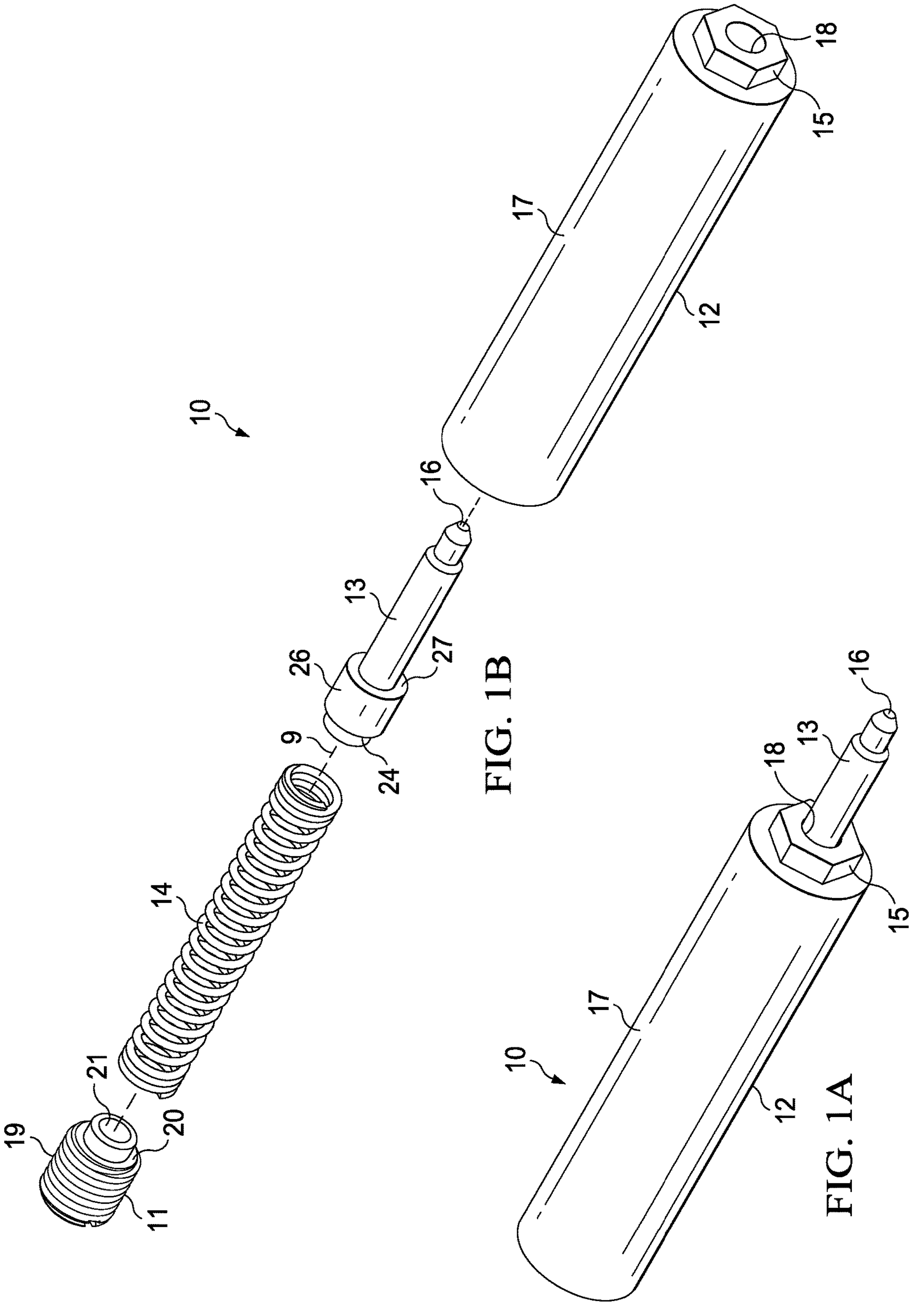
FIG. 1A shows an example embodiment of a plunger cartridge assembly.
FIG. 1B shows an example embodiment of a plunger cartridge assembly in an exploded assembly view.

An example embodiment is shown in FIG. 1A depicting a plunger cartridge assembly 10. The plunger cartridge assembly 10 has a plunger insulator 12. Plunger insulator 12 is a housing with an inner bore. Plunger insulator 12 is composed of a suitable material for electrically isolating the inner bore from the outer surface 17. Plunger insulator 12 in this example has a hex head 15, with a through hole 18, which is integral to the plunger insulator 12 and aids in installation of the plunger cartridge assembly 10. A contact plunger 13 is shown protruding from the through hole 18 of the hex head 15. The contact plunger 13 has a distal end 16. The contact plunger 13 is slideably engaged to the plunger insulator 12 via the through hole 18.

An example embodiment is shown in FIG. 1B depicting a plunger cartridge assembly 10 in an exploded assembly view. The plunger cartridge assembly 10 has a plunger insulator 12. Plunger insulator 12 is a housing with an inner bore. Plunger insulator 12 is composed of a suitable non-conductive material for electrically isolating the inner bore from the outer surface 17. Plunger insulator 12 in this example has a hex head 15, with a through hole 18, which is integral to the plunger insulator 12 and aids in installation of the plunger cartridge assembly 10. The contact plunger 13 has a cylindrical base 26 that has a spring shoulder 24 and a shoulder stop 27. The contact plunger 13 extends cantilevered from the base 26 and has a distal end 16. A contact screw 11 is used to secure the spring 14 into the plunger insulator 12. The contact screw 11 has outer threads 19 and a shoulder 20. The contact screw 11 also has an inner bore 21 that also has internal threads that are not shown in this view. The contact screw 11, contact plunger 13, and spring 14 are all composed of suitable electrically conductive materials. Contact screw 11, spring 14, contact plunger 13, and plunger insulator 12 are all assembled and aligned along a common axis 9. The spring 14 engages the shoulder 24. The spring 14 and the base 26 are slideably engaged within an inner bore of the plunger insulator 12.

Figure 1C:
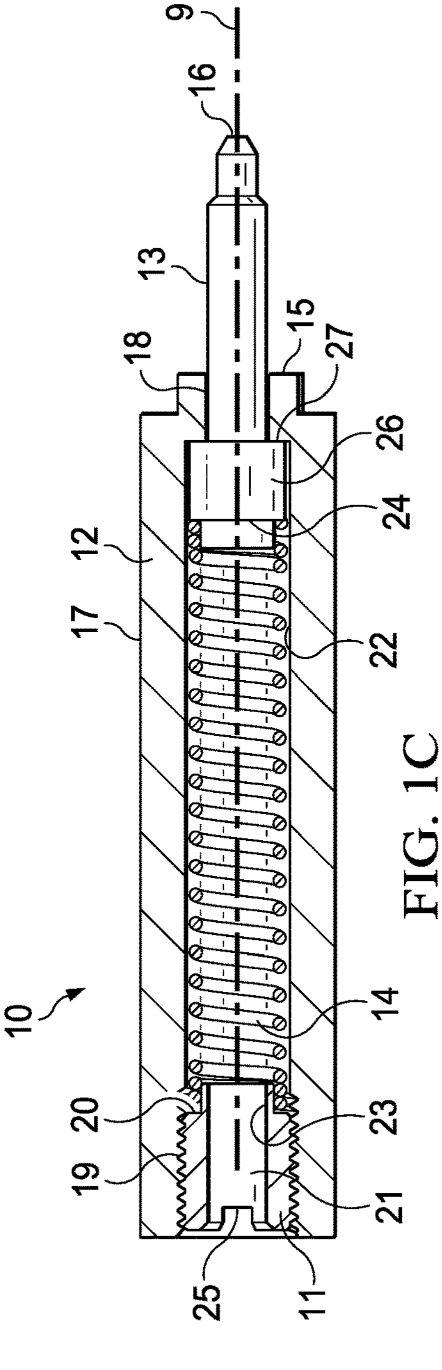
FIG. 1C shows an example embodiment of a side view cutaway of a plunger cartridge assembly.

An example embodiment is shown in FIG. 1C depicting a side view cutaway of a plunger cartridge assembly 10. The plunger cartridge assembly 10 has a plunger insulator 12. Plunger insulator 12 is a housing with an inner bore 22. Plunger insulator 12 is composed of a suitable material for electrically isolating the inner bore 22 from the outer surface 17. Plunger insulator 12 in this example has a hex head 15, with a through hole 18, which is integral to the plunger insulator 12 and aids in installation of the plunger cartridge assembly 10. A contact plunger 13 is shown protruding from the through hole 18 of the hex head 15. The contact plunger 13 has a distal end 16. The contact plunger 13 has a base 26 that has a spring shoulder 24 and a shoulder stop 27. A contact screw 11 is used to secure the spring 14 into the plunger insulator 12 via the shoulder 24. The contact screw 11 has an outer thread 19 and a shoulder 20. The contact screw 11 also has an inner bore 21 that may have internal threads 23. The inner bore 21 may also be smooth. The inner bore 21 may also have a combination of a smooth portion and a threaded portion. The contact screw also has a slot 25 that can accept a screwdriver. It may include other slotted features to accept other types of tools. The contact screw 11, contact plunger 13, and spring 14 are all composed of suitable electrically conductive materials. The spring 14 and the base 26 are slideably engaged within an inner bore 22 of the plunger insulator 12 along a common axis 9.

Still referring to FIG. 1C an example embodiment may include a plunger cartridge assembly 10 acting as an electrical connector having a plunger insulator 12 as a first cylinder having a common axis 9. The plunger insulator 12 then has a first end, a second end, a first inner bore 22 with a first diameter, the first inner bore 22 extending axially along axis 9 from the first end to form a third end within the plunger insulator 12. The plunger insulator 12 then has a second inner bore, and through hole 18, with a second diameter. The through hole 18 extends through from its second end to the third end. A second cylinder defining contact screw 11, having a third diameter, a first end, a second end, and a third inner bore, inner bore 21, with a fourth diameter. Inner bore 21 extends from the first end to the second end of the second cylinder. The contact screw 11 may be located within the first inner bore 22, axially aligned along axis 9 with the first cylinder, plunger insulator 12. The first end of the plunger insulator 12 may be substantially aligned with the first end of the contact screw 11. In this example the first end of the plunger insulator 12 and the first end of the contact screw 11 are nearly co-planar, however, the contact screw 11 may be positioned such that it is co-planar and therefore fully aligned with the plunger insulator 12 or the contact screw 11 may be driven deeper into inner bore 22 and such that a noticeable step exists between the plunger insulator 12 and the contact screw 11. A third cylinder defines base 24, having a fifth diameter, a first end, and a second end. The base 24 may be located within the first inner bore 22, axially aligned with the first cylinder, plunger insulator 12, and disposed in between the contact screw 11 and end of inner bore 22. A fourth cylinder having a sixth diameter defines the contact plunger 13. Contact plunger 13 may be axially aligned with the plunger insulator 12. Contact plunger 13 may have a first end integral with the second end of the base 24, and extend cantilevered from the base 24, engaged with the through hole 18, and having a distal end 16. The embodiment may also have a spring 14 axially aligned with the plunger insulator 12 and located in the inner bore 22 between the shoulder 20 of the contact screw 11 and the shoulder stop 24.

A variation of the example embodiment may include the first inner bore 22 spanning the majority of the axial length of the plunger insulator 12. The second diameter may be less than the first diameter. The third diameter may be substantially equal to the first diameter. The third diameter may be greater than the fourth diameter. The fifth diameter may be substantially equal to the first diameter. The sixth diameter may be substantially equal to the second diameter. The contact screw 11 may be threaded into the inner bore 22. The inner bore 21 may have inner threads. The spring 14 may be pre-loaded within the inner bore 22. The shoulder stop 27 of the base 26 may be located flush against the third end of the plunger insulator 12.

Figure 1D:
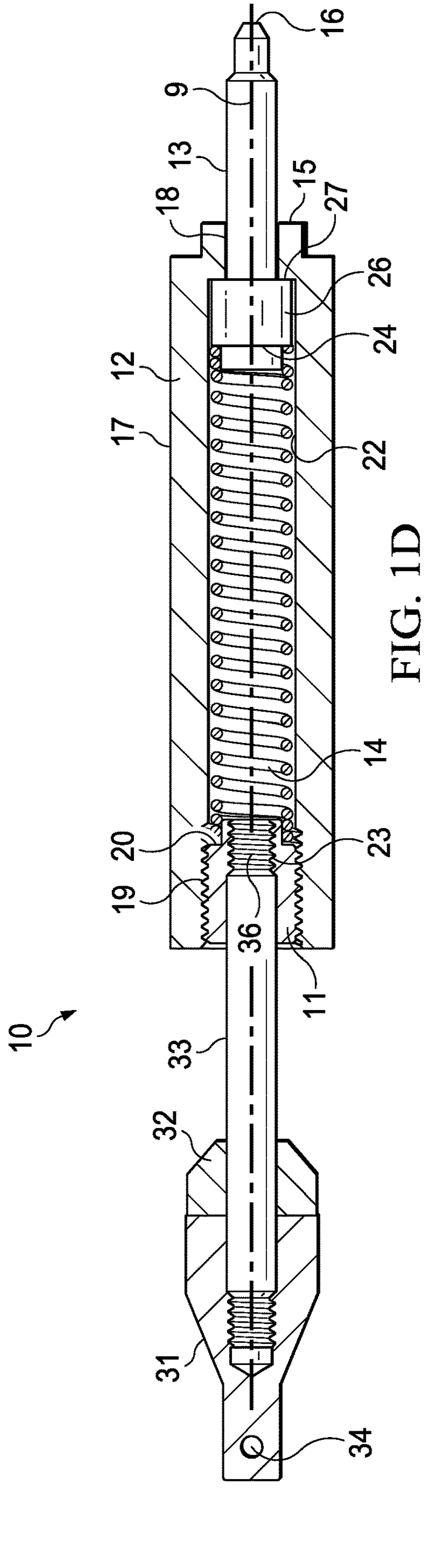
FIG. 1D shows an example embodiment of a side view cutaway of a plunger cartridge assembly combined with a contact rod.

An example embodiment is shown in FIG. 1D depicting a side view cutaway of a plunger cartridge assembly 10 combined with a contact rod 33. The plunger cartridge assembly 10 has a plunger insulator 12. Plunger insulator 12 is a housing with an inner bore 22. Plunger insulator 12 is composed of a suitable material for electrically isolating the inner bore 22 from the outer surface 17. Plunger insulator 12 in this example has a hex head 15, with a through hole 18, which is integral to the plunger insulator 12 and aids in installation of the plunger cartridge assembly 10. A contact plunger 13 is shown protruding from the through hole 18 of the hex head 15. The contact plunger 13 has a distal end 16. The contact plunger 13 has a base 26 that has a spring shoulder 24 and a shoulder stop 27. A contact screw 11 is used to secure the spring 14 into the plunger insulator 12. The contact screw 11 has an outer thread 19 and a shoulder 20. The contact screw 11 also has an inner bore 21 with inner threads 23. The contact screw also has a slot (not shown) or equivalent feature that can accept a screwdriver type tool. The contact screw 11, contact plunger 13, and spring 14 are all composed of suitable electrically conductive materials. The contact screw 11, contact plunger 13, base 26, spring 14, plunger insulator 12 all share a common axis 9. The contact rod 33 is threaded into a terminal nut 31 on one end and threaded into the contact screw 11 on the other end via threads 36 engaged with inner threads 23. In this example a contact rod 33 is connected to a terminal nut 31. Contact rod 33 may be insulated. Terminal nut 31 has a wire hole 34 that an electrically conducting wire may be secured too. An insulating washer 32 is used to help secure the assembly within a metal tool without shorting the circuit.

Figure 2A:
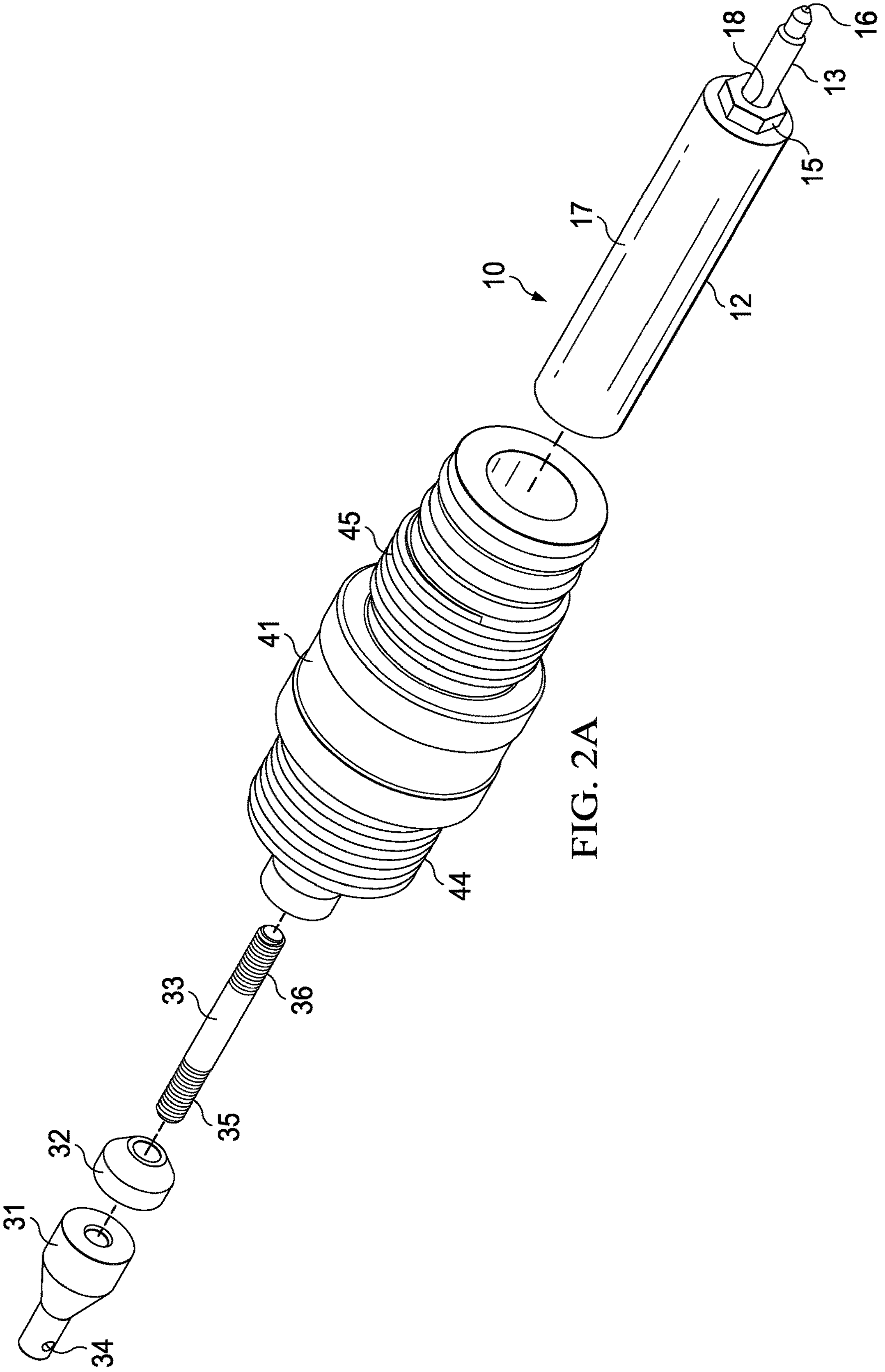
FIG. 2A shows an example embodiment of an exploded view of a contact sub assembly.

An example embodiment is shown in FIG. 2A depicting an exploded view of contact sub assembly. The plunger cartridge assembly 10 has a plunger insulator 12 with outer surface 17. A contact plunger 13 is shown protruding from the through hole 18 of the hex head 15. The contact plunger 13 has a distal end 16. In this example a contact rod 33, having a first threaded end 35 and a second threaded end 36, is connected to a terminal nut 31. In this example the contact rod 33 has external electrical insulation tubing. The second threaded end 36 engages threads within the contact screw located within the plunger cartridge assembly 10. The terminal nut 31 connects to a wire conductor via wire hole 34 from the wireline that is anchored to a cablehead. An insulating washer 32 is used to help secure the assembly within a metal contact sub body 41. In this example, an electrical signal can travel through a conducting wire to the terminal nut 31, then through a contact rod 33, through the plunger cartridge assembly 10, and exit the distal end 16 of the plunger 13, without shorting to the contact sub body 41. Threads 44 and 45 can join additional subs to the contact sub body 41.

Figure 2B:
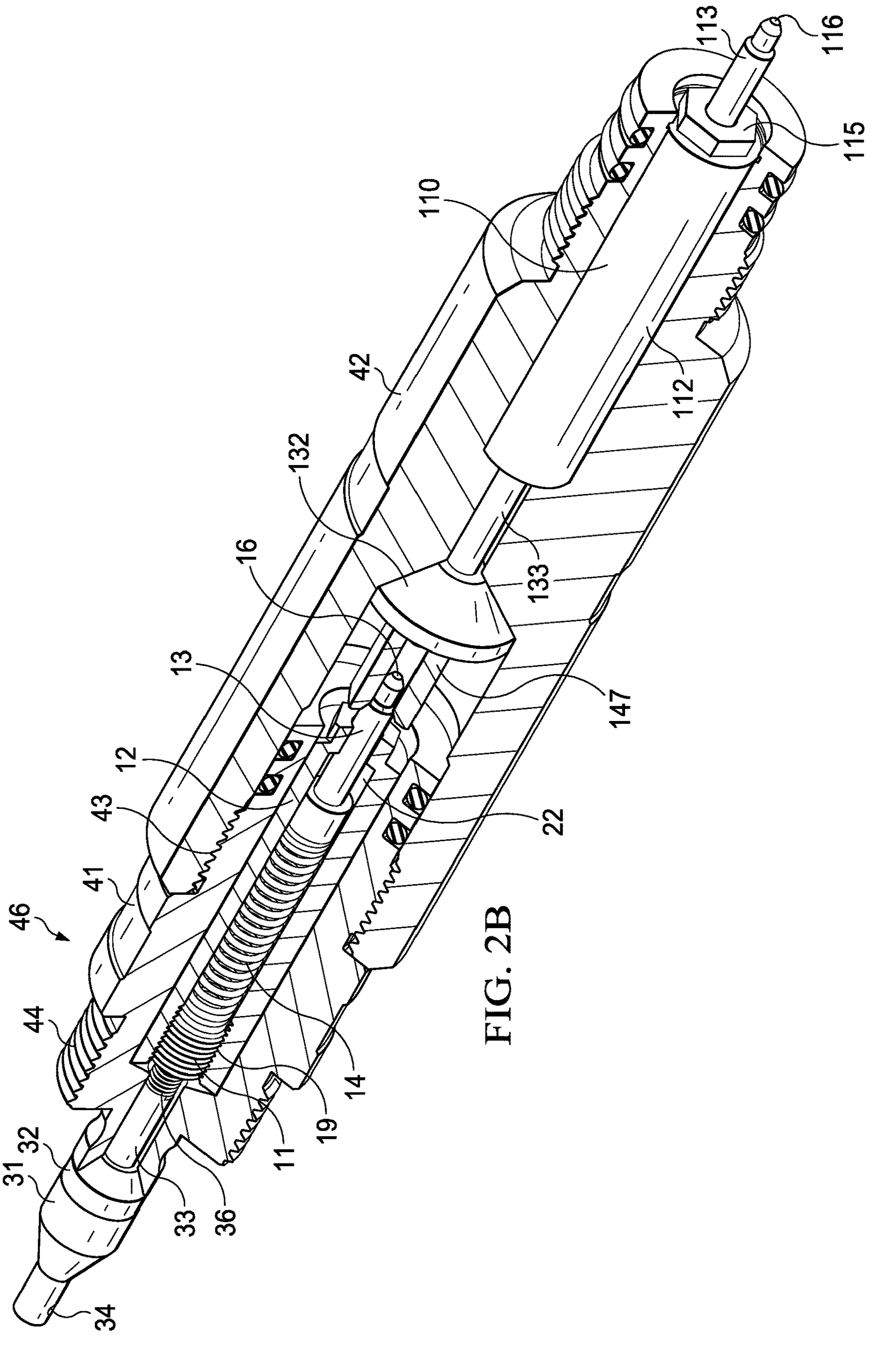
FIG. 2B shows an example embodiment of a cutaway view of a contact sub assembly engaged to a GO-Box pin adapter.

An example embodiment is shown in FIG. 2B depicting a cutaway view of a contact sub assembly 46 engaged to a GO-Box pin adapter 42. In this configuration a conducting wire (not shown) is secured to wire hole 34 of the terminal nut 31. A contact rod 33 is threaded into the terminal nut 31 and the contact screw 11 threaded into the plunger insulator 12. The insulator washer 32 is located on the contact rod 33, adjacent to the terminal nut 31, and contacts the contact sub body 41. The insulator washer 32 and the plunger insulator 12 prevent the contact rod, or any other conducting components in series with the conducting wire, from shorting to the contact sub body 41. A spring 14 provides the electrical connection from the contact screw 11 to the contact plunger 13. The distal end 16 of the contact plunger 13 makes contact with the plunger receiver 147. A contact rod 133 is used to connect the plunger receiver 147 to a plunger cartridge assembly 110. An insulating washer 132 and rod insulation tubing is used to prevent the contact rod 133 from shorting to the GO-Box pin adaptor 42. The plunger cartridge assembly 110 includes plunger insulator 112, hex head 115, contact plunger 113, and a distal end 116 for connecting to next component. As can be seen in FIG. 2B an electrical signal can travel from terminal nut 31 through to the contact plunger 113 without shorting to the GO-Box pin adaptor 42 or the contact sub assembly 46. Double seal contact sub 41 can thread into other subs or the GO-Box pin adaptor 42 using threads 43 and 44. Outer threads 19 of the contact screw secure it to the plunger insulator 12. Spring 14 and contact plunger 13 can move axially within the bore 22 of the plunger insulator 12.

Figure 3:
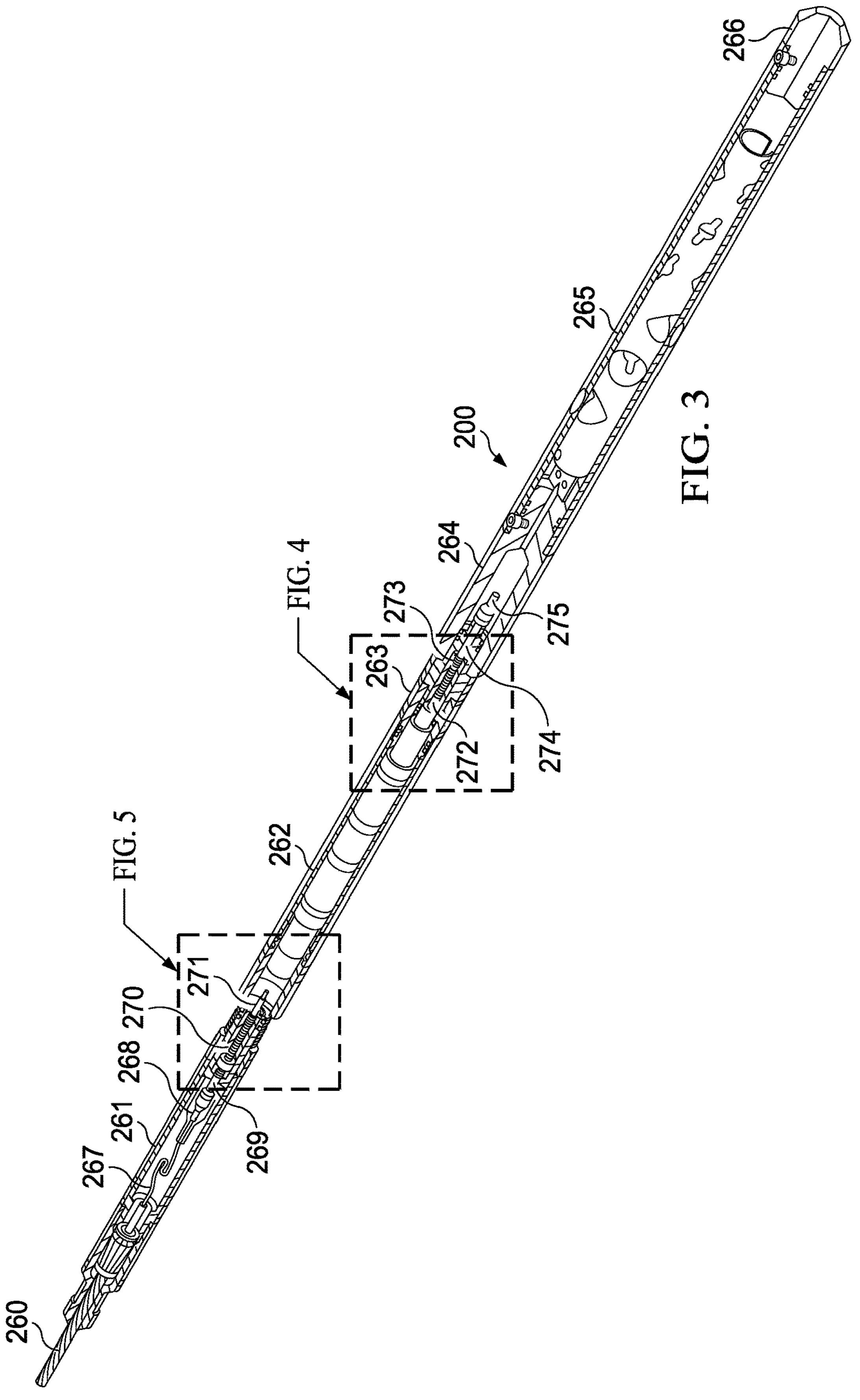
FIG. 3 shows an example embodiment of an entire tool string assembly.

An example embodiment is shown in FIG. 3 of an entire tool string assembly 200. A wireline 260 is connected to the cablehead assembly 261. Cablehead assembly 261 is threaded into a casing collar locator 262. The casing collar locator 262 is an electrically energized tool that can detect casing collars as the tool string assembly 200 is moving through downhole pipe. The casing collars can provide location information to the wireline operator. The casing collar locator 262 is connected to a double seal contact assembly 263. The double seal contact assembly 263 is then connected to a top sub 264. The top sub 264 is connected to a gun assembly 265. A gun bottom 266 is attached to the lower portion of the gun assembly 265. This is one example of a tool string; however, many variations and additional components may be involved, such as more gun assemblies and additional logging equipment.

Still referring to FIG. 3, the wireline 260 enters the cablehead assembly 261. A conducting wire 267 is connected to the cablehead assembly 261 and the terminal nut 268. The terminal nut 268 is connected to the plunger cartridge assembly 270 via contact rod 269. The plunger 271 protruding from the plunger cartridge assembly 270 interfaces with and supplies electrical power to the casing collar locator 262. On the lower side of the casing collar locator 262 a second electrical connection is made with a second plunger cartridge assembly 273 via plunger 272. The plunger cartridge assembly 273 is connected to the contact rod 274, which is further connected to terminal nut 275. A conducting wire may connect the terminal nut 275 to a detonator for use with the gun assembly 265. The casing of the tool string assembly 200 may act as the electrical ground.

Figure 4:
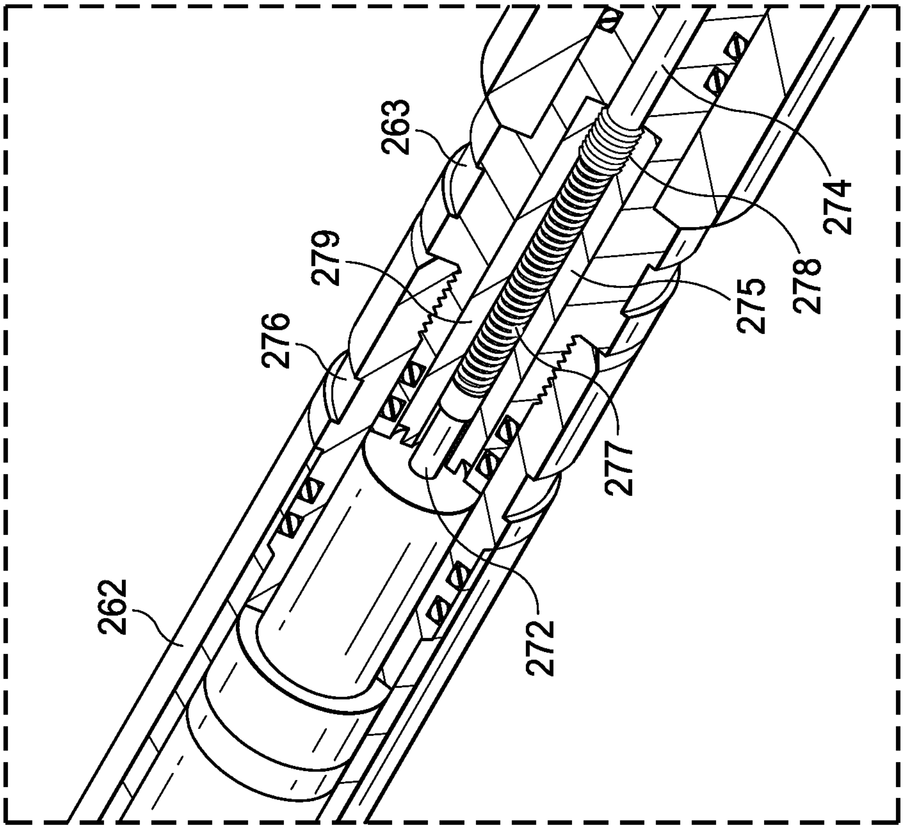
FIG. 4 shows an example embodiment of a casing collar locator coupled to the double seal contact assembly.

Further detail of an example embodiment is shown in FIG. 4 where the casing collar locator 262 is coupled to the double seal contact assembly 263 using the coupling 276. The cartridge assembly 275 comprises a plunger 272, contact screw 278, spring 277, and an insulator 279. The plunger 272 plugs into and makes an electrical connection to the casing collar locator 262. The spring 277 provides the electrical connection between the contact screw 278 and the plunger 272. A contact rod 274 is screwed into the inner bore of the contact screw 278.

Figure 5:
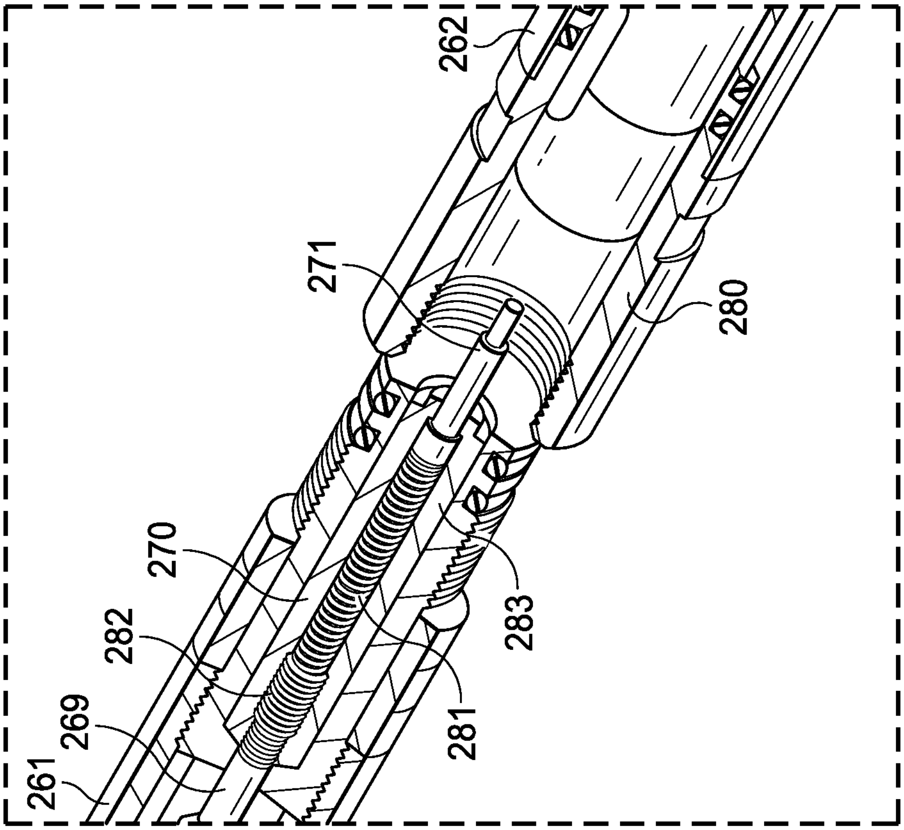
FIG. 5 shows an example embodiment of a casing collar locator coupled to a cablehead assembly.

Further detail of an example embodiment is shown in FIG. 5 where the casing collar locator 262 is coupled to the cablehead assembly 261. The cartridge assembly 270 comprises a plunger 271, contact screw 282, spring 281, and an insulator 283. The plunger 271 plugs into and makes an electrical connection to the casing collar locator 262. The spring 281 provides the electrical connection between the contact screw 282 and the plunger 271. A contact rod 269 is screwed into the inner bore of the contact screw 282.

Figure 6:
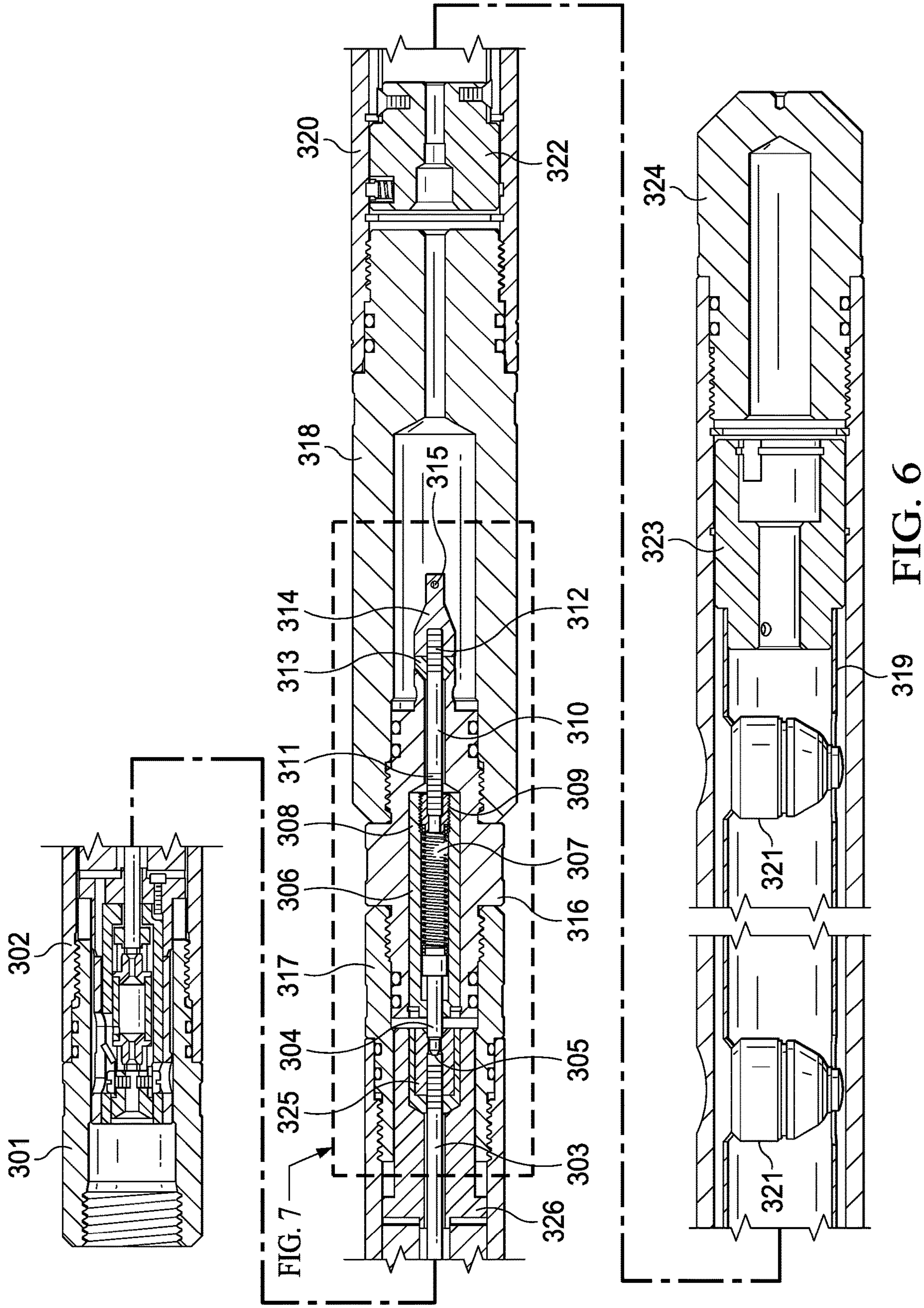
FIG. 6 shows an example embodiment side cutaway view of a fully assembled tool.

The side cutaway view of an example embodiment in FIG. 6 shows a fully assembled tool. Casing collar locator 326 is connected to a coupling sub 302. The casing collar locator 326 is electrically connected to the cartridge 308 via electrical connection 303 in contact with the plunger 304 using connector 325. The distal end 305 of the plunger 304 provides the electrical contact with the connector 325. The threaded coupling end 301 is connected to the coupling sub 302 and allows for additional tools to be added to the drill string. Adaptor sub 317 connected to the coupling sub 302 and the double seal contact sub 316. The cartridge 308 is located within the double seal contact sub 316. The cartridge 308 includes the plunger 304, an electrically conductive spring 307, an insulator 306, and the electrically conductive screw 309. A conducting rod 310 is screwed into the screw 309 via threads 311. The other end of the conducting rod 310 has threads 312 screwed into the terminal nut 314 with through hole 315. A nonconductive washer 313 is located between the terminal nut 314 and the double seal contact sub 316. The double seal contact sub 316 is screwed into the top gun sub 318. Top gun sub 318 is screwed into the gun assembly 320. The gun assembly 320 contains an end fitting 322, charge tube 319, end fitting 323, and shaped charges 321 located within the charge tube 319. Gun bottom sub 324 is threaded into the gun assembly at the bottom of the tool string in this example.

Figure 7:
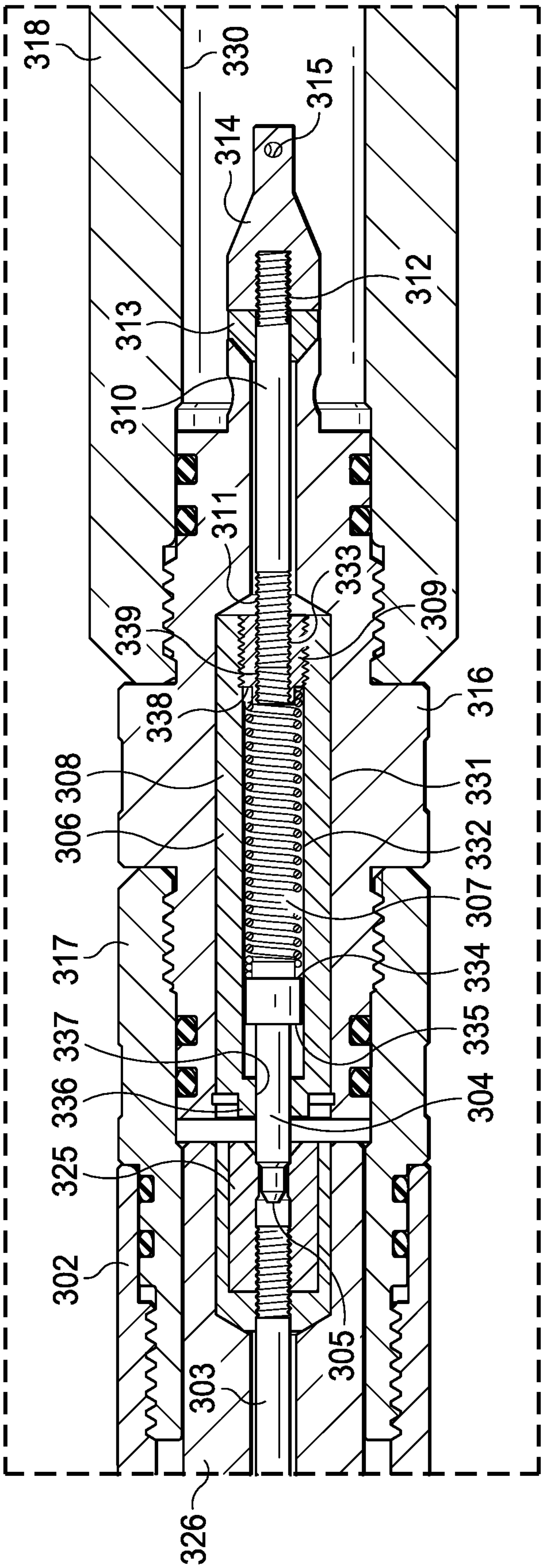
FIG. 7 shows an example embodiment side cutaway view of a cartridge plunger assembly located within the double seal contact sub.

The side cutaway view of an example embodiment in FIG. 7 shows a cartridge 308 located within the double seal contact sub 316. The casing collar locator 326 located in the coupling sub 302 is electrically connected to the cartridge 308 via electrical connection 303 in contact with the plunger 304 using connector 325. The distal end 305 of the plunger 304 provides the electrical contact with the connector 325. Adaptor sub 317 connects the coupling sub 302 and the double seal contact sub 316. The cartridge 308 is located within the inner bore 331 of the double seal contact sub 316. The cartridge 308 includes the plunger 304, an electrically conductive spring 307, an insulator 306, and the electrically conductive screw 309. Plunger 304 is located in the through bore 337 located through the hex head 336 and within the inner bore 332 of the insulator 306. A conducting rod 310 is screwed into the screw 309 via threads 311 that thread into the threads 339 located within the bore 333. The other end of the conducting rod 310 has threads 312 screwed into the terminal nut 314 with through hole 315. A nonconductive washer 313 is located between the terminal nut 314 and the double seal contact sub 316. The double seal contact sub 316 is screwed into the top gun sub 318. The top gun sub 318 has a bore 330 that allows for a conducting wire to connect from the terminal nut 314 with additional oil field tools connected to the top gun sub 318.

Further describing FIG. 7, the assembly of the cartridge relies on the spring 307 to keep the electrical conducting components in contact with each other. Spring 307 pushes the plunger shoulder 335 against the insulator 306. The spring 307 pushes against the shoulder 334 and the shoulder 338 of the screw 309.

Although the invention has been described in terms of particular embodiments which are set forth in detail, it should be understood that this is by illustration only and that the invention is not necessarily limited thereto. For example, terms such as upper and lower can be substituted with top and bottom, respectfully. Top and bottom could be left and right. Downhole or uphole can mean below or above, respectfully, when referring to relative locations within a borehole or of relative locations on a tool string. The alternative embodiments and operating techniques will become apparent to those of ordinary skill in the art in view of the present disclosure. Accordingly, modifications of the invention are contemplated which may be made without departing from the spirit of the claimed invention.

What is claimed is:

1. A cartridge electrical connector comprising:

a first cylinder having a common axis, a first end, a second end, a first inner bore with a first diameter, the first inner bore extending axially from the first end to form a third end within the first cylinder, and a second inner bore with a second diameter, the second inner bore extending through from the second end to the third end, wherein the first cylinder is electrically non-conductive;

a second cylinder having a third diameter, a first end, a second end, and a third inner bore with a fourth diameter, the third inner bore extending from the first end to the second end of the second cylinder, wherein the second cylinder is located within the first inner bore and is axially aligned with the first cylinder;

a third cylinder having a fifth diameter, a first end, a second end, wherein the third cylinder is located within the first inner bore, axially aligned with the first cylinder, and disposed in between the second cylinder and the third end of the first cylinder;

a fourth cylinder having a sixth diameter, being axially aligned with the first cylinder, having a first end integral with the second end of the third cylinder, and extending cantilevered from the third cylinder, through the second inner bore, and having a distal second end; and a spring axially aligned with the first cylinder and located in the first inner bore between the second end of the second cylinder and the first end of the third cylinder.

2. The cartridge electrical connector of claim 1, wherein the first inner bore spans the majority of the axial length of the first cylinder.

3. The cartridge electrical connector of claim 1, wherein the second diameter is less than the first diameter.

4. The cartridge electrical connector of claim 1, wherein the third diameter is substantially equal to the first diameter.

5. The cartridge electrical connector of claim 1, wherein the third diameter is greater than the fourth diameter.

6. The cartridge electrical connector of claim 1, wherein the fifth diameter is substantially equal to the first diameter.

7. The cartridge electrical connector of claim 1, wherein the sixth diameter is substantially equal to the second diameter.

8. The cartridge electrical connector of claim 1, wherein the second cylinder is threaded into the first inner bore.

9. The cartridge electrical connector of claim 1, wherein the third inner bore has inner threads.

10. The cartridge electrical connector of claim 1, wherein the second cylinder is electrically conductive.

11. The cartridge electrical connector of claim 1, wherein the third cylinder is electrically conductive.

12. The cartridge electrical connector of claim 1, wherein the fourth cylinder is electrically conductive.

13. The cartridge electrical connector of claim 1, wherein the spring is electrically conductive.

14. The cartridge electrical connector of claim 1, wherein the spring is pre-loaded within the first inner bore.

15. The cartridge electrical connector of claim 1, wherein the second end of the third cylinder is flush against the third end of the first cylinder.

16. The cartridge electrical connector of claim 1, wherein the first end of the second cylinder is substantially aligned with the first end of the first cylinder.

* * * * *